United States Patent [19]

Brantley et al.

[11] 4,011,854
[45] Mar. 15, 1977

[54] MOUNT FOR CONTINUOUSLY ORIENTING A COLLECTOR DISH IN A SYSTEM ADAPTED TO PERFORM BOTH DIURNAL AND SEASONAL SOLAR TRACKING

[75] Inventors: Lott W. Brantley, Union Grove; Billy D. Lawson, Madison, both of Ala.

[73] Assignee: The United States of America as represented by the Administrator of the National Aeronautics and Space Administration, Washington, D.C.

[22] Filed: Jan. 29, 1976

[21] Appl. No.: 653,422

[52] U.S. Cl. .............................. 126/270; 126/271; 250/203 R
[51] Int. Cl.² ............................................ F24J 3/02
[58] Field of Search .......................... 126/270, 271; 250/203 R

[56] References Cited
UNITED STATES PATENTS

| | | | |
|---|---|---|---|
| 811,274 | 1/1906 | Carter | 126/271 |
| 820,127 | 5/1906 | Pope | 126/271 |
| 2,460,482 | 2/1949 | Abbot | 126/271 |
| 3,713,727 | 1/1973 | Markosian et al. | 126/271 |
| 3,861,379 | 1/1975 | Anderson, Jr. | 126/271 |

Primary Examiner—John J. Camby
Assistant Examiner—Henry C. Yuen
Attorney, Agent, or Firm—L. D. Wofford; George J. Porter; John R. Manning

[57] ABSTRACT

A mount for continuously orienting a collector dish relative to the sun in a system adapted to perform both diurnal and seasonal solar tracking. The mount is characterized by a rigid, angulated axle having a linear midportion supporting a collector dish, and oppositely extended end portions normally related to the midportion of the axle and received in spaced journals. The longitudinal axis of symmetry for said midportion of the axle is coincident with a seasonal axis while the axes of the journals are coincident with a diurnal axis paralleling the earth's polar axis. Drive means are provided for periodically displacing the axle about the diurnal axis at a substantially constant rate, while other drive means are provided for periodically indexing the dish through 1° about the seasonal axis, once during each of the earth's successive rotations about its polar axis, whereby the position of the dish relative to the axle is varied for accommodating seasonal tracking as changes in the angle of inclination of the polar axis occurs.

6 Claims, 8 Drawing Figures

U.S. Patent    Mar. 15, 1977    4,011,854
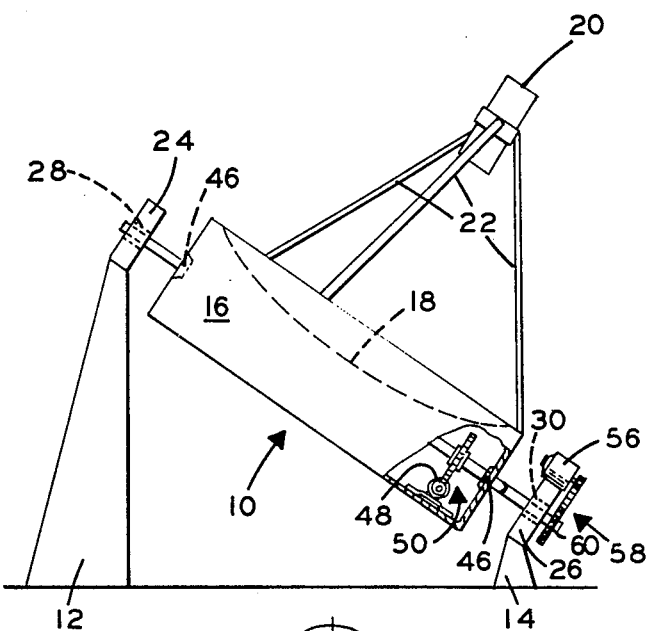
Fig.1
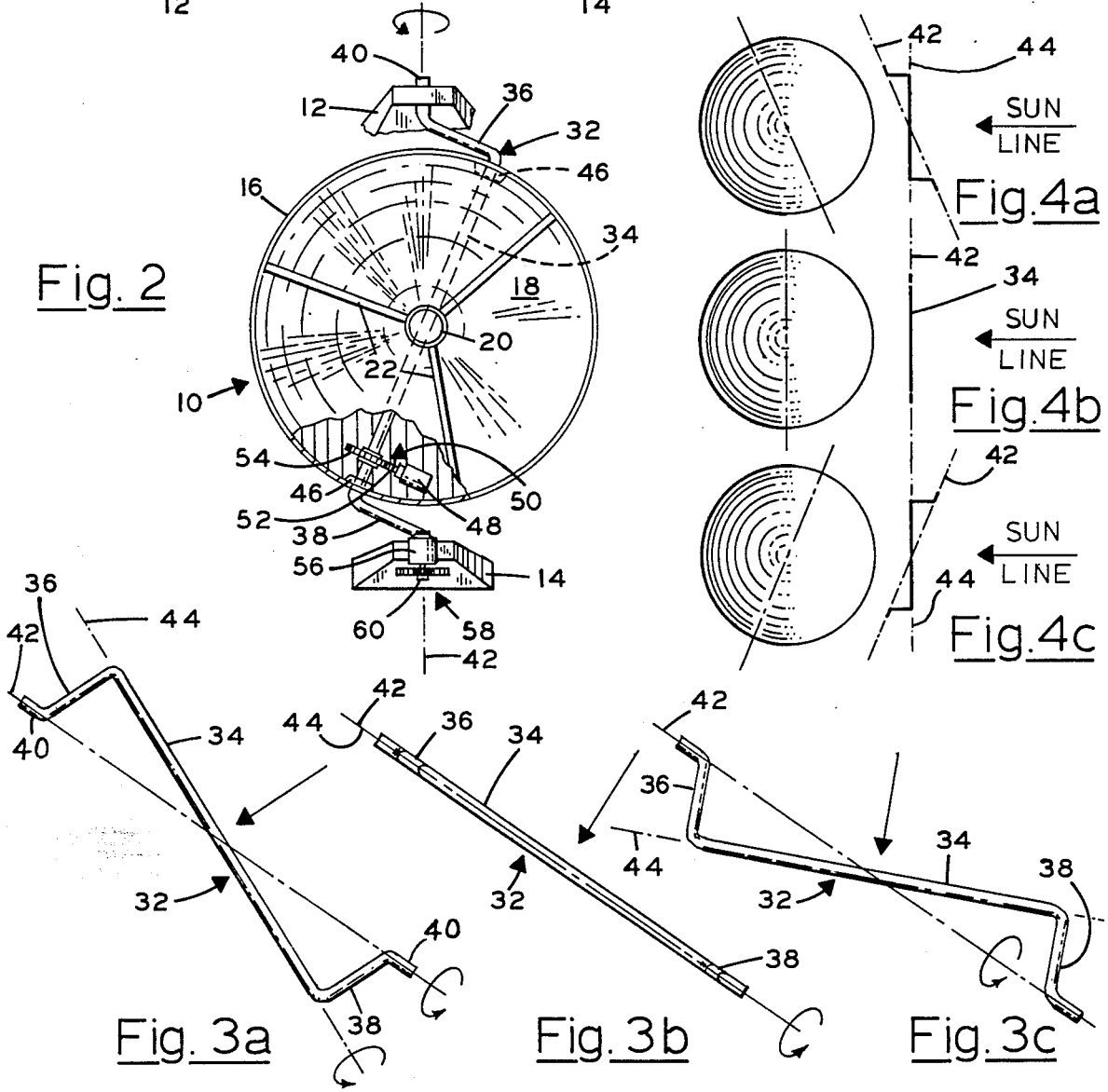
Fig.2
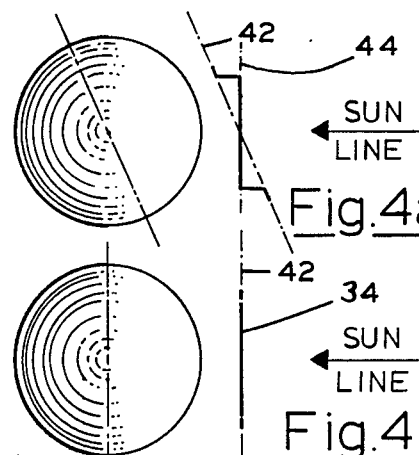
Fig.4a
Fig.4b
Fig.4c
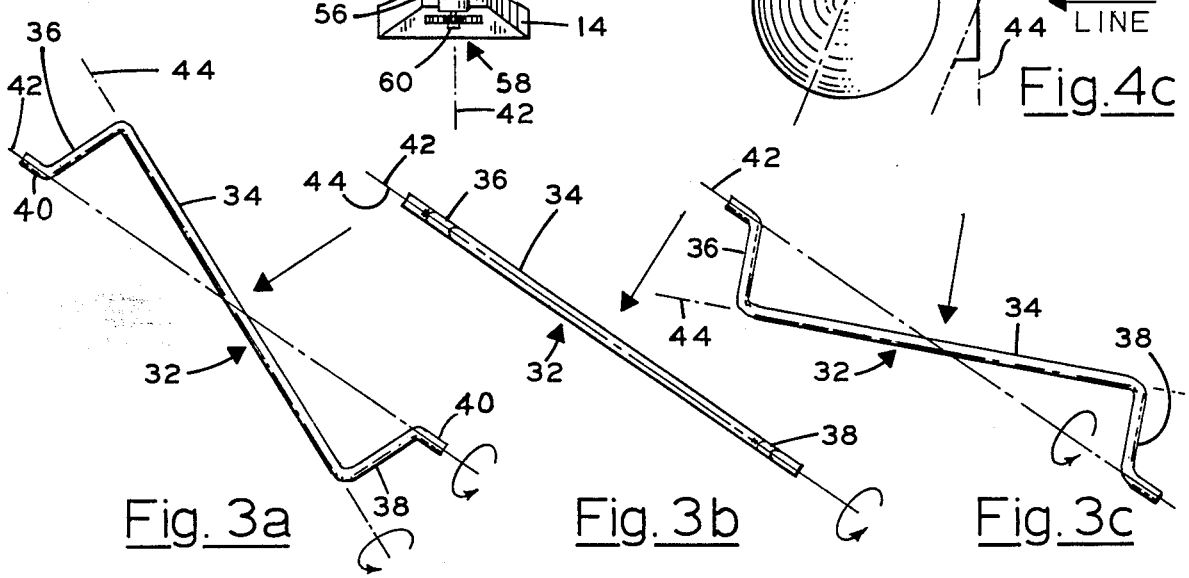
Fig.3a    Fig.3b    Fig.3c

MOUNT FOR CONTINUOUSLY ORIENTING A COLLECTOR DISH IN A SYSTEM ADAPTED TO PERFORM BOTH DIURNAL AND SEASONAL SOLAR TRACKING

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

1. Field of the Invention

The invention relates to solar tracking systems and more particularly to a mount for a collector dish in a tracking system for continuously orienting a collector dish relative to a line drawn from the sun and extended perpendicularly through the plane of the collector dish, hereinafter referred to as a sun line.

2. Description of the Prior Art

Systems for tracking moving celestial bodies are notoriously old. Usually such systems include a mount supported by a complex arrangement of gimbal rings through which compound rotation of the mount is accommodated as simultaneous biaxial rotation is achieved. Of course, as can be appreciated by those familiar with the design and operation of tracking devices, the design requirements which must be met in order to facilitate simultaneous biaxial rotation results in structure of a massive and complex nature.

In an attempt to overcome the various difficulties encountered when emloying a plurality of interrelated gimbal rings, it has been suggested that intersecting camways be provided through which a translation of a single axis can be accommodated in order that both diurnal and seasonal tracking be facilitated. However, these efforts have not proven to be entirely satisfactory because of attendant undesirable cost and complexity factors.

Since complexity in design and fabrication in tracking systems often results in increased production and maintenance costs being experienced, attended by a general reduction in total reliability, it can be appreciated that there currently exists a need for a simple and reliable mount for a collector dish which is capable of utilizing simple rotary motion in performing both seasonal and diurnal solar tracking functions. This need is emphasized in instances where the primary purpose for performing solar tracking is to collect solar energy at minimal costs.

It is, therefore, a general purpose of the instant invention to provide in a solar tracking system having a solar energy collector dish, an improved mount for continuously orienting the collector dish relative to the sun line utilizing the principles of simple rotary motion.

OBJECTS AND SUMMARY OF THE INVENTION

It is an object of the instant invention to provide an improved mount for a collector dish in a solar tracking system.

Another object is to provide an improved mount adapted to employ the basic principles of simple rotary motion for orienting a collector dish in a solar tracking system.

It is another object to provide a simple, economic and reliable mount for continuously orienting a collector dish relative to the sun line utilizing the basic principles of simple rotary motion during diurnal and seasonal tracking of the sun.

These and other objects and advantages are achieved through the use of a rigid axle characterized by a linear midportion connected with a collector dish supported for stepped angular displacement about a seasonal axis coincident with the longitudinal axis of symmetry for the midportion of the axle, and oppositely extended end portions normally related to the mid-portion and supported in a pair of axially spaced journals, the axes of which are coincident with a diurnal axis paralleling the polar axis of rotation for the earth, and drive means for periodically driving the axle at a constant rate in a counterclockwise direction about the diurnal axis and for intermittently indexing the dish through 1° of counterclockwise rotation about the seasonal axis during each successive 24 hour period.

BRIEF DESCRIPTION OF THE DRAWINGS

FIG. 1 comprises a side elevation of a tracking system including an improved mount having an axle supporting thereon a collector dish equipped with an energy absorber located at the focus of the dish.

FIG. 2 is a fragmented top plan view of the system shown in FIG. 1.

FIGS. 3 a through 3 c collectively illustrate alternative positions successively assumed by the axle as the earth is advanced from its winter solstice through its vernal equinox to its summer solstice.

FIGS. 4 a through 4 c collectively depict the relationship of the axle illustrated in FIGS. 3 a through 3 c and the earth's axis as the axle supports the collector dish in a plane perpendicular to the sun line as the earth is advanced from its winter solstice through its vernal equinox to its summer solstice.

DESCRIPTION OF THE PREFERRED EMBODIMENT

Referring now to the drawings wherein like reference characters designate like or corresponding parts throughout the several views there is shown in FIG. 1 a tracking system, generally designated 10, including a mount which embodies the principles of the instant invention.

As shown, the mount includes a pair of pedestals, designated 12 and 14, arranged in North/South alignment, formed of a suitable construction material and supported by a suitable bed, not shown.

The mount also includes a housing 16 of a substantially annular configuration having a circular face within which there is seated a reflector which serves as a solar energy collector dish, designated 18. The optics of the collector dish are suitable for reflecting incident solar energy to focus. As shown, the shape of the reflector generally conforms to that of a segment of a sphere. At the focus of the collector dish there is supported an energy absorber 20, of a suitable design. As a practical matter, the details of the absorber 20 form no specific part of the instant invention, therefore, a detailed description of the absorber is omitted in the interest of brevity. It suffices to understand that the absorber 20 is supported by a plurality of converging struts 22, the bases of which are rigidly affixed at equidistances about the periphery of the housing 16, and receives solar energy caused to impinge thereon for further processing.

It is important to note that the mount also includes a pair of coaxially aligned journal blocks 24 and 26. These journal blocks are supported at the crown of the pedestals 12 and 14 and are provided with coaxially aligned journal bearing sleeves 28 and 30, respectively. The journal sleeves serve to receive in supporting relation opposite end portions of a rotatable, angulated axle, generally designated 32.

The axle 32 is of a rigid construction and includes a linear midportion 34 from which there is projected a first orthogonally related end portion 36 and a second orthogonally related end portion 38, projected in opposite coplanar relation with the end portion 36. It is to be understood that the end portions 36 and 38 are of equal lengths determined by the maximum deviation of the earth's polar axis from a plane normal to the sun line. The end portions terminate in a pair of angulated projections forming a pair of coaxially aligned wrist pins 40. The wrist pins 40 are received in the journal bearing sleeves 28 and 30 and support axle 32 for rotation about an axis of rotation designated 42 paralleling the earth's polar axis. The axis 42 is for the sake of convenience herein referred to as a diurnal axis, since it is about this axis that the collector dish 18 is caused to rotate at a constant rate of 360° per day as diurnal tracking of the sun occurs.

It is particularly important to note that the journal blocks 24 and 26 are so located that the axis 42 is obliquely related to another axis of rotation, designated 44, which coincides with the longitudinal axis of symmetry for the midportion 34 of the axle 32. This axis is, also for the sake of convenience, referred to as a seasonal axis, since it is about this axis that the collector dish 18 is caused to rotate in stepped progression of 1° per day as seasonal tracking of the sun occurs.

The midportion 34 of the axle 32 is, as shown, extended diametrically through the circular housing 16 in a manner such that the seasonal axis 44 lies in the plane of the collector dish 18 and diametrically bisects the dish. The midportion of the axle is connected with the dish through a pair of suitable bearing sleeves 46 seated in the housing 16. Thus the housing 16 and the collector dish 18 are supported for angular displacement about the midportion 34 of the axle 32 and, consequently, for rotation about the midportion of the seasonal axis 44.

In order to impart stepped angular displacement to the housing 16, about the seasonal axis 44, a suitable motor 48 is mounted within the housing 16. The rotary output shaft of the motor is connected in driving relation with the axle 32 through a suitable drive train, generally designated 50. As shown, the drive train 50 includes a worm 52 meshed with a pinion 54 rigidly affixed to the midportion 34 of the axle 32. Therefore, the motor 48 upon being activated serves to drive the housing 16 in angular displacement about the axle 32 through the drive train 50.

In order to impart angular displacement of the axle 32, about the diurnal axis 42, for thus angularly displacing the collector dish 18 in a diurnal tracking mode, there is provided a motor 56 mounted on the pedestal 14 and connected with the axle 32 through a gear train 58. The gear train 58, as shown, includes a pair of meshed spur gears, not designated, one of which is fixed to the output shaft of the motor 56 and the other to a stub shaft 60 connected in coaxial alignment with the adjacent wrist pin 40. It will, of course, be appreciated that a suitable gear ratio is established for the gear train 58 so that the axle 32 is angularly displaced about the diurnal axis 42 at a constant rate of 15° per hour. Where so desired, the output of the motor 56 is reversible, through selective energization, whereby reversed directional rotation can be imparted to the collector dish 18 so that the dish can be reset to an initial starting position, relative to the diurnal axis 42, without being angularly advanced through 360°.

As best illustrated in FIGS. 3 a through 3 c, the seasonal axis 44 progressively assumes alternate positions relative to the diurnal axis 42, as the axle 32 is rotated about the diurnal axis. Hence, by daily indexing the axle through 1° about the diurnal axis, it is possible to maintain a perpendicular relationship between the seasonal axis 44 and the sun line, as the angle of inclination for the earth's polar axis is varied, as indicated in FIGS. 4 a through 4 c. It is, therefore, periodically possible to reposition the collector dish 18 to a plane perpendicularly related to the sun line, simply by angularly displacing the collector dish in stepped progression about the midportion 34 of the axle 32 once a day. If desired, angular displacement about the axle is simultaneous with and at a rate corresponding to the rate at which the angle of inclination of the polar axis for the earth changes, as change in seasons occurs.

One technique for assuring that the collector dish 18 is indexed at a proper rate about the seasonal axis 44, as the earth advances in its eliptic orbit, requires the collector dish 18 to be indexed through 1° to counterclockwise rotation about the midportion of the axle 32 once during each successive 24 hour period while the axle 32 simultaneously is rotated through a similar distance in an opposite direction. Thus the collector dish 18 is caused to remain substantially oriented in a plane to which the sun line is perpendicularly related, while the inclination of the plane, with respect to the earth's polar axis, is varied as changes in seasons occur.

OPERATION

It is believed that in view of the foregoing description, the operation of the device will readily be understood and it will be briefly reviewed at this point.

With the mount for the system 10 assembled in the manner hereinbefore described, the collector dish 18 initially is prepared to perform both seasonal and diurnal tracking of the sun. The initial position for the mount is achieved when the collector dish 18 is positioned in a plane to which the sun line is perpendicularly related. Solar tracking, both seasonal and diurnal, is effected when the position established for the collector dish 18 is maintained as the earth rotates about its polar axis and advances in its eliptic orbit about the sun.

Diurnal tracking is accomplished by energizing the motor 56 for angularly displacing the axle 32 in a counterclockwise direction about the diurnal axis 42 at a constant rate equal to the rate at which the earth rotates on its axis, or ¼° per minute.

Seasonal tracking is accomplished by daily altering the position of the collector dish 18, relative to the axle 32. This is achieved by indexing the axle 32 in a clockwise direction, once every 24 hours, through 1° of rotation about the diurnal axis, while the collector dish 18 is indexed, during the same period, in a counterclockwise direction through 1° of angular displacement about the axle and hence about the seasonal axis 44.

Where continuous tracking is desired, synchronous clock-type motors are employed for simultaneously displacing the axle 32 about the diurnal axis and the collector dish 18 about the seasonal axis, concurrently and continuously. Moreover, where desired, such motors connected in a closed loop drive system can be employed for this purpose. Such a system preferably includes one set of North/South sensors for developing a reference signal for driving the collector dish about the seasonal axis 44 and an East/West set of sensors for developing a reference signal for driving the axle 32 about the diurnal axis 42.

It should, in view of the foregoing, be readily apparent that the tracking system which embodies the principles of the instant invention utilizes the principles of simple rotary motion in achieving constant orientation of a solar collector dish relative to a sun line.

Although the invention has been herein shown and described in what is conceived to be the most practical and preferred embodiment, it is recognized that departures may be made therefrom within the scope of the invention, which is not to be limited to the illustrative details disclosed.

We claim:

1. In a solar tracking system including a solar energy collector dish, an improved mount for continuously orienting the dish relative to the sun comprising:
   A. means for maintaining the collector dish in a reference plane through which a line projected from the sun extends substantially perpendicularly as the earth rotates on its polar axis, including a rigid axle having a linear midportion connected in supporting relation with said dish and oppositely extended end portions normally related to the midportion;
   B. each of the extended end portions having an outwardly projected end which extends in opposing directions with respect to each other and coaxial to an axis of rotation;
   C. spaced journal means connected to said end portions at said projected ends thereof for supporting said axle for angular displacement about said axis of rotation parallel to said polar axis and obliquely related to an axis coincident with the longitudinal axis of symmetry for the midportion of the axle; and
   D. drive means connected with said axle for angularly displacing said axle about said axis of rotation.

2. The mount of claim 1 wherein said dish is supported for angular displacement about the midportion of the axle.

3. The mount of claim 2 further comprising other drive means for angularly displacing the dish about the midportion of the axle.

4. The mount of claim 3 wherein said drive means includes a continuously operable drive train for angularly displacing said axle about said axis in counterclockwise rotation at a constant rate, and indexing means for indexing the axle through 1° of clockwise rotation once during each successive 24 hour period.

5. The mount of claim 4 wherein said other drive means includes an intermittently operable drive train for indexing the dish through 1° of counterclockwise rotation about the longitudinal axis of symmetry for the midportion of the axle, once during each successive 24 hour period.

6. The mount of claim 4 further comprising means for supporting an absorber at the focus of said collector dish.

* * * * *